United States Patent [19]

Artman

[11] 4,320,728
[45] Mar. 23, 1982

[54] ENGINE PRECOMBUSTION CHAMBER WITH PROVISIONS FOR VENTING THEREOF AND FUEL STRATIFICATION THEREIN

[76] Inventor: Noel G. Artman, 15830 Nicklaus La., Sun City, Ariz. 85351

[21] Appl. No.: 105,074

[22] Filed: Dec. 19, 1979

[51] Int. Cl.³ .......................... F02B 3/00; F02B 23/00
[52] U.S. Cl. .................................... 123/293; 123/286; 123/283; 123/261; 123/260; 123/263; 123/275
[58] Field of Search ............... 123/260, 261, 262, 263, 123/275, 293, 286, 283

[56] References Cited

U.S. PATENT DOCUMENTS

| | | | |
|---|---|---|---|
| 2,855,908 | 10/1958 | Pflaum | 123/32 |
| 2,884,913 | 5/1959 | Heintz | 123/293 |
| 3,053,238 | 9/1962 | Meurer | 123/293 |
| 3,102,521 | 9/1963 | Slemmons | 123/263 |
| 3,304,922 | 2/1967 | Hideg | 123/32 |
| 3,443,552 | 5/1969 | von Seggern | 123/263 |
| 4,036,202 | 7/1977 | Weslake | 123/293 |

FOREIGN PATENT DOCUMENTS 2715943 10/1978 Fed. Rep. of Germany .... 123/32 C

OTHER PUBLICATIONS

Publication: Car and Driver, Feb. 1975, pp. 56, 58 and 80. Article titled "Road Test: Honda Civic CVCC", By Don Sherman.

*Primary Examiner*—Ronald B. Cox

[57] ABSTRACT

Stratified charge four-stroke-cycle internal combustion engine with fuel injection and spark-ignition of the type wherein stratification and initial combustion occurs in a combustion chamber auxiliary to the variable volume space in the engine cylinder between the piston and the cylinder head. Unique aspirating passage means communicating between the auxiliary chamber and the variable volume space conducts and causes air entering the chamber at one end, pursuant to the piston's compression stroke, to form a substantially non-turbulent air column rotating about the chamber axis and acretively compressed, by continued entry of air, toward and against the opposite end of the chamber. Fuel is injected into air initially in the chamber and that initially entering through the aspirating passage to mix with such air to form a spark-ignitable air-fuel mixture compressed against said other chamber end. The remaining air forced into the chamber pursuant to the compression stroke comprises a substantially discrete mass creating the desired compression of the chamber contents for spark-ignition and combustion of the fuel.

13 Claims, 5 Drawing Figures

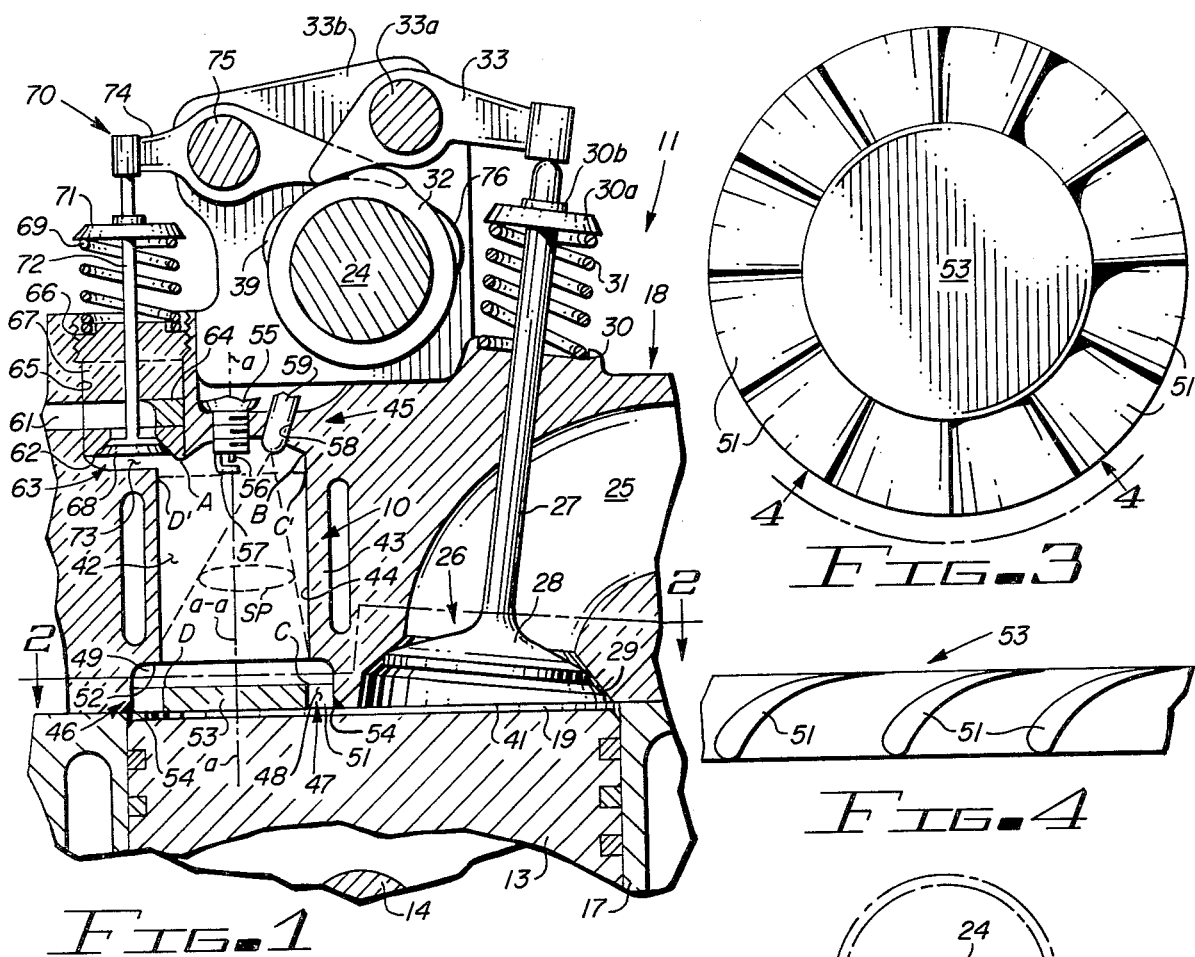
Fig-1
Fig-3
Fig-4
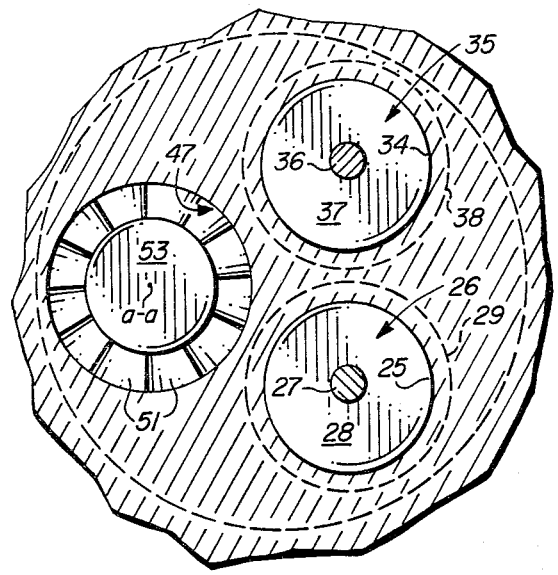
Fig-2
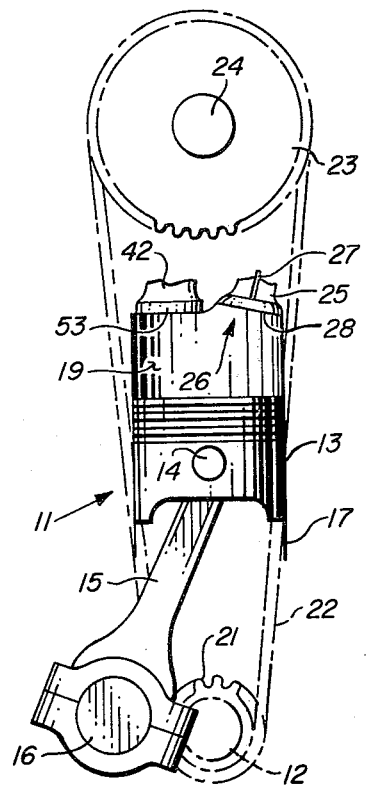
Fig-5

ENGINE PRECOMBUSTION CHAMBER WITH PROVISIONS FOR VENTING THEREOF AND FUEL STRATIFICATION THEREIN

SUMMARY OF THE INVENTION

This invention relates to internal combustion engines of the type wherein combustion is initiated in a combustion chamber auxiliary to and communicative with what is commonly termed the combustion chamber of an orthodox Otto or four-stroke-cycle engine. The invention particularly concerns an auxiliary or precombustion chamber structure and combustion process utilizing fuel injection to form a spark-ignited air-fuel mixture as distinguished from compression ignition in which ignition occurs at higher pressure and temperature of the combustibles. Diesel (compression ignition) engines of the precombustion chamber species have historically operated in an acceptable manner without venting residue combustion products from that chamber because of its small volume, typically 1/16th of the volume occupied by the same quantity of air at atmospheric pressure. Hence the oxygen particles of the air compressed into the Diesel engine precombustion chamber, in addition to being at the flash point temperature of the Diesel fuel injected thereinto, are crowded together for profuse contact and oxydizing relation with the hydrocarbons of this fuel. The products of combustion reside remaining in this precombustion chamber after exhaust of the engine cylinder and filling of such cylinder with air during the ensuring air intake stroke of the cylinder's piston are at or less than atmospheric pressure and constitute no more than (typically) 1/16th of the volume of air to be forced into the precombustion chamber and thus mixed therewith pursuant to the ensuing compression stroke of the piston. With this low volume ratio of residue combustion products to that of air compressed into the precombustion chamber, the fuel flash point temperature of the air, and the manner of injection which causes the fuel to indiscriminately contact oxygen molecules throughout the compressed mass of swirling air, the presence of such residue products does not prevent compression ignition and combustion with acceptable reliability and efficiency.

Contrarily, in the matter of the spark-ignition system in which the precombustion chamber is of greater volume 1/7th or 1/8th that of the displacement (variable volume) space in the engine cylinder, for example, in contrast to 1/16th as explained above, the oxygen molecules of the air compressed into the chamber are spaced apart more distantly, and the air temperature is much below flash point temperature of the injected fuel. Another factor inhibitive of ignition and efficient burning of fuel injected into the larger volume precombustion chamber is this chamber's greater volume content of noncombustible products retained from a previous combustion and which, when mixed with the charge of compressed fresh air, dilutes this air to greater extent.

An object of this invention relates to an Otto cycle engine precombustion chamber wherein fuel is injected and which has an aspirating passage at an end communicating with a variable volume space within a cylinder of such engine, and is the provision of a valve-controlled air inlet communicating with such chamber at the opposite end in spaced relation to the aspirating passage and operable during at least a portion of the air intake stroke of the piston in such cylinder to admit air into said chamber to replace and force at least a portion of residue products of a preceding combustion through the aspirating passage into the variable volume space.

One purpose of the auxiliary combustion chamber is its adaptability to the formation therein of an air-fuel stratum of ideal mixture for ignition and discrete from the remaining chamber content which varies from air substantially unmixed with fuel to air mixed with a combustion-sustaining quantity of fuel variable according to whether the engine is to operate under idling, part load, or full load conditions. Contaminants of a previous combustion, if left in an unscavenged precombustion chamber, would be concentrated by being compressed into the stratum where ignition occurs, thereby requiring a greater quantity of injected fuel to attain operation and reliability of ignition, particularly under idle or part load conditions. This is a further reason for the valve-controlled air inlet and its function to scavenge products of a previous combustion from the chamber.

A further object of this invention is the provision of an auxiliary combustion chamber structure which controls the flow of air entering the same in a manner obtaining improved stratification within the chamber. This is done by so constructing the aspirating passage communicating between the engine cylinder variable volume space and the precombustion chamber that air entering the chamber from such space is first directed circumferentially of the chamber into an open channel circumscribing the chamber inner periphery near an end of the chamber. From this channel the air is directed radially inwardly of the chamber to form an end portion of an air column rotating about the chamber axis while being compressed toward the opposite end of the chamber by additional air similarly directed. The channel inhibits any part of the entering air flowing jet-like axially within the chamber which character of flow would create turbulence throughout the entire air mass within the chamber and thus inhibit stratification.

The invention also contemplates a precombustion chamber structure with stratification performance characteristics and of physical form that when disposed in the cylinder head of a reciprocating piston engine, no part of the structure must project from the face of that head into the variable volume space between that face and the engine piston.

DESCRIPTION OF DRAWING FIGURES

FIG. 1 is a fragmentary sectional view of an engine cylinder, piston and cylinder head in which there is an auxiliary internal combustion chamber structure embodying a preferred form of this invention.

FIG. 2 is a fragmentary sectional view taken on the line 2—2 of FIG. 1, in the direction indicated by the arrows associated with that line.

FIG. 3 is an enlarged inner end face view of a prefabricated part assembled into the lower end portion of the auxiliary combustion chamber structure.

FIG. 4 is a fragmentary panoramic side elevational view taken on the line 4—4 of FIG. 3, in the direction indicated by the arrows associated with that line.

FIG. 5 is a fragmentary diagrammatic non-scaled view illustrating the drive train for the engine valve-operating cam shaft.

DESCRIPTION AND EXPLANATION OF THE ILLUSTRATED FORM OF THE INVENTION

The auxiliary internal combustion chamber structure 10, FIG. 1, and controls therefor, constituting generally the preferred form of this invention, are illustrated as part of an engine 11, FIGS. 1 and 4, of the well-known Otto or four stroke cycle type, using gasoline or equivalent evaporative fuel adapted for spark ignition. The crankshaft 12 of this engine is driven by one or more pistons 13 of which each is connected to the crankshaft by a piston pin 14, a connecting rod 15 and a crank bearing 16 of the crankshaft. The piston reciprocates in a cylinder 17 wherein this piston and a cylinder head 18 bound a variable volume space 19. A sprocket 21 rotating with the crankshaft and through a chain or positive-drive belt 22 and sprocket 23 drives the engine overhead camshaft 24 synchronously with the crankshaft and in timed relation with reciprocative movement of the piston.

Air is admitted to the variable volume space 19 through an inlet passage 25 controlled by an inlet poppet valve 26 of conventional construction having a stem 27 and a head 28 shown in FIG. 1 resting on a seat 29. The valve is closable upon the seat 29 by a spring 31 and unseatable against the force of this spring by a cam lobe 32 rotatable with the camshaft 24 to pivot the rocker arm 33, thus forcing the valve stem and its head 28 downwardly. Rocker arm 33 is pivoted on a bearing 33a supported by a bracket 33b projecting upwardly from the cylinder head 18. Valve spring 31 reacts between a valve seat 30 and a spring cup 30a constrained against axial movement on the stem 27 by a snap ring 30b. Orthodox venting of the variable volume space 19 is through an exhaust passage 34, FIG. 2, controlled by an exhaust valve 35. This valve is constructed and operated similarly to the inlet valve 26, it having a stem 36 nd a head 37 cooperable with a seat 38 therefor. Valve 35 operates under control of a cam lobe 39 rotatable with camshaft 24 and that pivots a rocker arm (not shown) similar to 33 to compress a spring (not shown), operating similarly to 31, to unseat the valve head 37.

The engine thusfar described is of conventional structure with the exception of the chamber structure 10 and that on completing the up-stroke of the piston 13 the variable volume space 19 is diminished inordinately by this flat top piston approaching more closely to the cylinder head underface 41. This diminished clearance between the piston and the cylinder head underface is to provide that, on the compression up-stroke of the piston 13, most of the air thus compressed will be forced from the variable volume space into and for compression in combustion chamber 42 of chamber structure 10.

The combustion chamber structure 10 includes a sidewall 43 having a cylindrical inner periphery 44 and endwall portions 45 and 46 spaced apart axially of such periphery to complement the the sidewall in the formation and enclosure of the chamber 42. The principal axis of chamber 42 and of the sidewall periphery 44 is designated a—a. Combustion chamber structure 10 includes aspirating passage means 47 communicating between chamber 42 and the variable volume space 19. Such passage means has a duct portion 48 and a channel portion 49 in communicative series therewith. The channel portion 49 is in the form of an open channel in the sidewall periphery 44 contiguous to the lower endwall portion 46 and extending circumferentially of such periphery substantially within a plane perpendicular to the principal axis a—a. The duct portion 48 is in the form of an annular opening communicating with the variable volume space 19 and leading therefrom through the lower endwall portion 46 in axial registry with the sidewall 43. Duct portion 48 includes air deflector vanes 51, FIGS. 1, 2 and 3, spaced apart linearly of such annular opening and tilted in the same direction helically with respect to the chamber axis a—a to discharge compressed air from the variable space linearly of and into the open channel 49. An air deflecting shoulder 52 of open channel 49 is in opposed spaced relation to that part of the chamber endwall portion 46 comprising the air deflector vanes 51 to cause displacement of the air directed thereagainst by said vanes radially inwardly of the combustion chamber so no jet-like flow occurs axially of the chamber cylindrical periphery. Endwall portion 46 of the chamber structure 10 includes a prefabricated disclike part 53 having the vanes 51 preassembled therewith. These vanes may be fabricated from heat resisting metal such as titanium or an alloy thereof and may be assembled with the part 53 in the fashion of turbine blades to their rotor. The radially outer ends of these vanes are welded in place to the cylinder head 18 as shown at 54.

A spark plug 55 mounted in the upper endwall portion 45 coaxially of the combustion chamber presents air-fuel mixture igniting means in the form of spark-gap electrodes 56 and 57. A bore 58 through the endwall portion constitutes means accommodative of and for mounting a fuel injector 59. An air inlet passage 61 leads laterally into the combustion chamber through the sidewall 43 adjacently to the upper endwall portion 45. This passage leads through an annular valve seat 62 of inlet valve means 63 and a C-shaped spacer member 64. The valve seat 62 and spacer member 64 are mounted in a cylinder head bore 65 where they are retained by a bearing plug 67 screwed into a threaded portion 66 of such bore. Inlet valve means 63 includes a head 68 releasably held on the valve seat 62 by a spring 69 reacting between the plug 67 and a spring cup 71 mounted on the valve stem 72 of valve head 68. Valve 63 is opened when the stem 72 is forced downwardly, displacing the head 68 from the seat 62 into an enlarged vestibule portion 73 of the air inlet passage. Inlet valve operating means 70 for operating valve 63 includes a rocker arm 74 pivotal on a bearing 75 supported in the bracket 33b and a cam lobe 76 rotatable with the camshaft 24 to effect operation of the valve in timed relation with movement of the engine piston 13.

Operation of this engine with its improved components is as follows: Starting with the downward air-intake stroke of piston 13, air is drawn into the variable volume space 19 through the then open inlet valve 26. The exhaust valve is closed during this piston stroke. Cam lobe 76 pivots rocker arm 74 to open air inlet valve 63 immediately after commencement of the piston air-intake stroke; that is, preferably as soon as the air pressure in the variable volume space 19 becomes subatmospheric, and is allowed to remain open long enough for the air thus admitted into the combustion chamber 42 to replace and discharge at least a substantial part of the products of the previous combustion from this chamber through the aspirating passage means 47 into the variable volume space.

During the ensuring compression stroke of piston 13 the exhaust valve 35 remains closed and both inlet valves 26 and 63 are closed. Air compressed in the contracting variable volume space 19 is forced from this space through the aspirating passage means 47 into the combustion chamber 42. The air passing through the annular duct portion 48 of this passage means is deflected by the vanes 51 helically relatively to the combustion chamber axis a—a and linearly of and into the open channel 49 toward the shoulder 52 which further deflects the incoming annular air stream into the form of a substantially flat annulus rotating within a plane or planes perpendicular to axis a—a; that is, with cessation of the helical motion or any component of motion axially of the combustion chamber. The shoulder 52 directs the rotating annulus of air into the combustion chamber adjacently to its lower endwall part 53 from which the rotating air is displaced and compressed upwardly in the form of an air column rotating or spinning as a relatively nonturbulant mass about the combustion chamber axis pursuant to the compression stroke of the engine piston. The vanes 51 and the shoulder 52 constitute baffle means disposed for engagement by the air entering the chamber 42 from the variable volume space 19 to sequentially first impart to such air a helical motion about the chamber axis and then deflect the helically moving air inwardly of the chamber radially of its axis.

Fuel injection into the combustion chamber from the injector 59 may always commence at the same time which may be near completion of the air intake stroke and continue for a time determinable of engine power output. Under engine idling conditions, fuel injection commencing near the end of the air intake stroke would continue for only a very short time, for example, until commencement of the compression stroke. In such instance the fuel directed in the form of a spray pattern, as illustrated at SP in FIG. 1, toward the lower endwall of the combustion chamber would atomize and mix with air in the chamber. This air and the fuel thus mixed therewith is the first to be compressed upwardly in the combustion chamber by the rotating air column accretively advanced from the bottom of the chamber as above explained, pursuant to the compression stroke of engine piston 13. Note in FIG. 1 that the air column completely filling the combustion chamber at the beginning of the compression stroke occupies the space ABCD, but during that stroke is compressed to a density to occupy the much foreshortened space ABC'D'. Thus there is formed adjacent the chamber upper endwall a compressed stratum of combustible air-fuel mixture which with the proper amount of injected fuel will consist of an air to fuel stoichiometric ratio, approximately 15 to 1 being ideal for spark ignition of air and gasoline. Of the completely compressed and spinning column within the chamber 42, that portion adjacent the lower end wall and extending upwardly to the stratum or mass of air-fuel mixture portion constitutes a stratum or discrete mass of predominantly air adjoining the air-fuel mixture mass. It is not imperative that the lower part of the air-fuel stratum or mass shall engage the upper part of the air stratum or mass at a thin cleavage-like plane perpendicular to the chamber axis a—a such as would contain and coincide solely and precisely with a boundary as C'D' between masses respectively in spaces as ABC'D' and D'C'CD. Some localized interprotrusion and intermixing of these two masses may occur at their juncture without significant impairment of the ignition and combustion process, providing migration of fuel particles from the air-fuel mass into the predominantly air mass is so limited that the readily ignitable and combustible character of the air-fuel mass enveloping the electrodes 56, 57 endures until ignition occurs.

To increase engine power output the fuel injection period is lengthened but, after fuel cut-off, delivery of air continues for the full compression stroke of the engine piston to form the lower stratum of air in the combustion chamber and place full charge of air in the chamber to create the desired density for ignition and combustion of the fuel. The volume of chamber 42 will be, for example, 1/7th that of the variable volume space 19 so that pressure in this chamber upon completion of the compression stroke will be about the same as that in the variable volume space of a typical spark ignition engine having an 8 to 1 compression ratio. At full load, injection may continue through ¾ths of the compression stroke, for example, although the injection rate is also a factor in determining the time of fuel delivery cut-off. But with all operation at less than full load there will be an upper stratum of ignitable combustible air-fuel mixture enveloping the space between the spark plug electrodes and a lower stratum of air, the upper stratum being thicker axially of the chamber and thus more voluminous in proportion to the amount of power to be delivered by the engine.

Ignition will occur slightly before or at about commencement of the power stroke of piston 13. The flame front of burning fuel ensuing spark at the electrodes 56–57 advances spherically therefrom through the air-fuel mixture stratum, increasing the temperature and pressure in the combustion chamber, forcing the hot gasses through the annular aspirating passage 47 into the variable volume space 19 to force the piston 13 downwardly in effecting its power stroke. At full load the amount of fuel in the air compressed into the combustion chamber may be such that some unburned particles of fuel will be swept into the variable volume space before their combustion occurs. This occurrence is particularly likely with respect to fuel injected against the endwall part 53 and the vanes 51 that is not mixed with and swept into the chamber by the air rushing thereinto during the compression stroke.

During the exhaust stroke of the piston 13, that next follows, only the exhaust valve 35 will be open. Products of combustion will be exhausted from the contracting variable volume space 19 but not from the combustion chamber 42. This is an operating characteristic that improves emissions control. The combustion products retained in the combustion chamber amount to about ⅛th of the total thereof in this chamber and in the variable volume space following the piston's power stroke, so about ⅞ths of these combustion products are exhausted during the exhaust stroke. However, as explained above, during the ensuing intake stroke the air inlet valve 63 opens, permitting air to replace and force the residue combustion products from the chamber 42 into the variable volume space 19. Since fuel is injected in this replacement air and later, during the compression stroke, compressed with this air into a combustible air-fuel mixture stratum enveloping the spark electrodes 57–56, the residue combustion products do not impede ignition and combustion of the fresh air-fuel charge. Instead, these residue combustion products, during the compression stroke, are dispersed within the air forced through the aspirating passage 47 to form the lower stratum in chamber 42 immediately preceding ignition. Pursuant to combustion that follows this ignition, said dispersed products are again subjected to the combustion flame front, head and pressure which causes at least part of the hydrocarbons and carbon monoxide to oxidize, burn, thus utilizing their latent energy and avoiding their exhaust into the atmosphere, as polluting emissions.

I claim:

1. In an internal combustion chamber structure operable in combination with an engine cylinder having a head at an end thereof and a piston reciprocally in such cylinder to move away fron such head to expand a variable volume space receivable of air and thereafter toward said head to compress the air in such space; said structure being disposed in said cylinder head and having a sidewall with a substantially cylindrical interior periphery and endwall portions spaced apart axially of such periphery to complement the sidewall in the formation and enclosure of the combustion chamber of said structure; said structure comprising aspirating passage means communicating between the variable volume space and said combustion chamber and having a duct portion and a channel portion disposed in communicative series with the duct portion, the channel portion being an open channel in the inner periphery of said sidewall contiguous to one of said endwall portions and extending circumferentially of said periphery within a plane substantially perpendicular to the principal axis of such periphery, said duct portion communicating with said variable volume space and leading therefrom through said one endwall portion in axial registry with the structure sidewall and disposed at an attitude of direction to discharge compressed air from the variable volume space linearly of and into said open channel, said structure also comprising a fuel injector communicating with the combustion chamber and adapted to direct fuel into the chamber to form a combustible air-fuel mixture with the air introduced into the chamber through the aspirating passage means, and air-fuel mixture igniting means disposed in said chamber adjacently to the other endwall portion of said structure.

2. An internal combustion chamber structure operable in combination with an engine cylinder in which a piston is axially reciprocal to compress air in a variable volume space at least partly in such cylinder attendant to performance of a compression stroke in one direction and to be subsequently displaced in the opposite direction in the performance of a power stroke pursuant to the discharge of an ignited air-fuel mixture under pressure into each variable volume space; said structure having a sidewall with an interior periphery generated circularly about a principal axis thereof, and endwall portions spaced apart axially of such periphery and complementing the same in the formation and enclosure of the combustion chamber of said structure; said structure comprising aspirating passage means for said chamber and having serially communicating duct and channel portions, the channel portion being an open channel in the sidewall inner periphery contiguous to one of the structure endwall portions and extending circumferentially of such periphery substantially within a plane disposed perpendicularly to said axis, said duct portion being communicative with said variable volumne space and leading therefrom through said one endwall portion in axial registry with the sidewall and disposed at an attitude of direction to discharge air from the variable volume space linearly of and into said open channel, said structure including means accommodative of fuel injection means for creating a combustible air-fuel mixture with the air admitted into the chamber, and also including means accommodative of air-fuel mixture igniting means within the chamber adjacently to the other end portion of said structure.

3. An internal combustion chamber structure operable in combination with an engine cylinder in which a piston is axially reciprocal to compress and displace air from a variable volume space at least partly in such cylinder attendant to performance of a compression strokke in one direction; said structure having a sidewall with an interior periphery generated circularly about a principal axis thereof, and endwall portions spaced apart axially of such periphery and complementing the same in the formation and enclosure of the combustion chamber of said structure, the chamber inner periphery being of greater diameter with a narrow portion extending circumferentially thereof adjacent one of said endwall portions to provide a shoulder circumscribing said periphery in opposed spaced relation with said endwall portion, said shoulder being substantially within a plane perpendicular to the chamber axis and complementing the opposed endwall portion in the establishment of an open channel communicating radially inwardly with the interior of the chamber, said structure including aspirating passage means communicating between the variable volume space and the interior of said chamber and comprising said channel and a duct portion in communicative series therewith, said duct portion extending through the one endwall portion into communication with said variable volume space and disposed in such position and attitude of direction to discharge compressed air from said space into said channel linearly thereof and toward said shoulder.

4. An internal combustion chamber structure in accordance with claim 3 wherein the duct portion of the aspirating passage means is comprised of an annular opening in the one endwall portion, said opening being coaxial with and registering axially with said shoulder, and air deflector vanes within said opening, said vanes being spaced apart linearly of said annular opening and tilted in the same direction helically with respect to said axis to direct the compressed air linearly of said channel and toward said shoulder.

5. An internal combustion chamber structure operable in combination with an internal combustion engine cylinder having an upper end closed by a cylinder head having a face facing axially downwardly into the cylinder, and the engine including a piston axially reciprocal in the cylinder to compress air in a variable volume space between the piston and the cylinder head face attendant to performance of a compression stroke directed toward said face; said chamber structure including a sidewall within said head and having an interior periphery generated circularly about the principal axis of such periphery, and respective upper and lower endwall portions spaced apart axially of such periphery and complementing the same in the formation and enclosure of the combustion chamber of said structure, said chamber structure being disposed eccentrically of the principal axis of the cylinder and the lower extremity of said lower endwall portion being substantially flush with the cylinder head face to avoid collision by the piston pursuant to its compression stroke, the chamber inner periphery being of greater diameter within a narrow portion extending circumferentially thereof adjacent the lower endwall portion to provide a shoulder circumscribing said periphery in opposed spaced relation with such endwall portion, said shoulder being substantially within a plane perpendicular to the chamber axis and complementing the lower endwall portion in the establishment of an open channel communicating radially inwardly with the interior of the chamber, said structure including aspirating passage means communicating between said variable volume space and the interior of said chamber and comprising said channel and a duct portion in communicative series with said channel, said duct portion extending downwardly through the lower endwall portion and said lower extremity thereof into communication with the variable volume space and disposed in such position and attitude of direction to receive compressed air from said space and to discharge such air into said channel linearly thereof and toward said shoulder.

6. An internal combustion chamber structure in accordance with claim 5 wherein the duct portion of the aspirating passage means is comprised of an annular opening in the lower endwall portion, said opening being coaxial with and registering axially with said shoulder, and air deflector vanes within and spaced apart linearly of said opening, and said vanes being tiled in the same direction helically with respect to the chamber periphery axis to direct the compressed air from the variable volume space linearly into the channel and toward said shoulder.

7. An auxiliary internal combustion chamber structure and controls therefor operable in combination with a cylinder of an internal combustion engine of the four-stroke-cycle type wherein the cylinder has in contiguity with an end thereof a variable volume space wherein a piston is reciprocal to sequentially perform a stroke of power attendant to expansion of said space by pressure of heated expanding products of combustion upon the piston, a stroke of exhaust to expel such products attendant to contraction of said space, a stroke of air intake attendant to the next expansion of said space, and a stroke of compression to compress the intaken air attendant to the next contraction of said space; said auxiliary chamber structure havng a sidewall with an interior periphery generated circularly about a principal axis thereof, and endwall portions spaced apart axially of said periphery and complementing the same in the formation and enclosure of the combustion chamber of said structure, said structure being accommodative of air initially in said chamber and including aspirating passage means communicating between the variable volume space and the interior of said chamber adjacently to one of the endwall portions, said passage means being operable pursuant to said compression stroke to conduct compressed air from the variable volume space into said chamber adjacently to the one endwall portion and said passage means and chamber being configured to create from such conducted air a vortex with at least a major portion thereof encircling said axis and spirally contracting radially inwardly of the chamber and thus forming of such conducted air a columnar mass spinning about said axis and projecting axially of the chamber toward the other endwall portion to compress, segregate and displace a major portion of air initially in the chamber toward and at least partially into contiguity with said other endwall portion, fuel injector means operable during the piston compression stroke to inject fuel into said said initial air to mix and form therewith a compressed combustible air-fuel mixture mass contiguous to said other endwall portion, ignition means disposed in the chamber in position to be enveloped by said mass and energizable near the beginning of said power stroke to ignite the compressed air-fuel mass, the aspirating passage means being operable during combustion of the air-fuel mass ensuing such ignition to conduct a portion of the products of such combustion from said chamber into the variable volume space and thus effect the power stroke of the piston, the residual portion of said products of combustion subsequent to the ensuing exhaust stroke of the piston remaining within said chamber, said chamber structure having an air inlet passage leading into the chamber contiguously to said other endwall portion, inlet valve means operable to control flow through said inlet passage, and valve operating means operable in timed relation with the engine piston to preclude flow through the inlet passage during the power, exhaust and compression strokes of the piston and to accommodate flow of air through this inlet passage into said chamber during at least a portion of each intake stroke of the piston to replace at least some of the residual portion of combustion products by expulsion thereof through the aspirating passage means.

8. The subject set forth in claim 7 wherein the ignition means is mounted centrally in said other endwall portion.

9. The subject set forth in claim 7 wherein the fuel injector means includes an injector mounted in said other endwall portion and constructed and arranged to inject fuel in a diverging spray pattern directed toward the one endwall portion.

10. An auxiliary internal combustion chamber structure and controls therefor operable in combination with a cylinder of an internal combustion engine of the four-stroke-cycle type wherein the cylinder has adjacent one end thereof a variable volume space and a piston is reciprocal in said cylinder to sequentially perform a power stroke pursuant to expansion of said space by pressure of heated expanding products of combustion therein upon the piston, an exhaust stroke to expel such combustion products attendant to contracting said space, an air intake stroke to accommodate entrance of air into said space attendant to the next expansion thereof, and a compression stroke to compress the intaken air attendant to the next contraction of said space; the combustion chamber of said structure being accommodative of air initially occupying the same and having opposite ends between which an axis extends centrally of the chamber and of which ends one is closed and the other includes apirating passage means disposed in two-way communication between the chamber and said variable volume space and thus accommodative to the passage of air from said space into the chamber pursuant to the compression stroke of the piston and to the passage of expanding gas and products of combustion from the chamber into the variable volume space to force the piston to perform its power stroke, said combustion chamber and said aspirating passage means being configured to cause air entering the chamber from said space to create from such entering air a vortex with at least a major portion thereof encircling said axis and spirally contracting radilly inwardly of the chamber and thus forming of such entering air a columnar mass spinning about said axis and projecting axially of the chamber toward its closed end to compress, segregate and displace a major portion of air initially occupying the chamber and of that air initially thus entering the chamber from said space toward and at least partially into contiguity with the closed chamber end, said structure including fuel injection means operable to inject fuel into such occupying and initially entering air in an amount to mix and form therewith an ignitable combustible air-fuel mixture, ignition means contiguous to said closed end of the chamber and operable to ignite said air-fuel mixture near the beginning of said power stroke to cause combustion of the air-fuel mixture and the passage of a portion of the ensuing expanding gas and products of combustion from the chamber into the variable volume space to effect the power stroke of the piston ensuing such ignition, a residual portion of said products of combustion remaining in the chamber following completion of such ensuing stroke and the next following exhaust stroke of the piston, the chamber structure having an air inlet passage leading into the chamber contiguously with said closed end and comprising inlet valve means operable to control flow through such passage, and valve operating means operable in timed relation with the engine piston to accommodate flow of air through said passage during at least a portion of the air intake stroke of the piston to replace at least some of the residue products of combustion by expulsion thereof through the aspirating passage means into the variable volume space and also replace air initially occupying said chamber.

11. An auxiliary internal combustion chamber structure and controls therefor operable in combination with a four-stroke-cycle internal combustion engine cylinder having an upper end closed by a cylinder head with a face facing downwardly into such cylinder, the engine including a piston reciprocal in said cylinder and a variable volume space disposed between the piston and the cylinder head, said piston as it reciprocates sequentially performs a power stroke attendant to expansion of said space by pressure of heated expanding products of combustion in said space upon the piston, an exhaust stroke to expel such combustion products attendant to contraction of said space, an air intake stroke attendant to the next expansion of the space and admittance of air thereinto, and a compression stroke to compress the intaken air attendant to the next contraction of said space; said chamber structure including a sidewall within said head and having an interior periphery generated about a principal axis thereof and respective upper and lower endwall portions spaced part axially of such periphery and complementing the same in the formation and enclosure of the combustion chamber of said structure, aspirating passage means communicating through said lower endwall portion and between the variable volume space and the interior of said chamber and being operable pursuant to the piston compression stroke to conduct compressed air from the variable volume space into said chamber, said passage means and said chamber being configured to cause the air entering the chamber from said space to displace and compress the air thus first entering the chamber into a mass contiguous to the upper endwall portion, fuel injection means operable during the piston compression stroke to inject fuel into the first entering air to mix and form therewith a compressed ignitable combustible air-fuel mixture comprising said mass, ignition means disposed contiguously with the upper endwall portion within said mass and energizable near the beginning of said power stroke to ignite said mixture, the aspirating passage means being operable during combustion of the air-fuel mixture ensuing such ignition to conduct a portion of the expanding products of such combustion from the chamber into the variable volume space to effect the piston power stroke, a residual portion of the combustion products remaining in the chamber subsequent to the ensuing exhaust stroke of the piston, the chamber structure having an air inlet passage leading through the cylinder head laterally into the chamber contiguously to the upper endwall portion, a section of the inlet passage adjacent the combustion chamber constituting a vestibule to the chamber, inlet poppet valve means comprising an annular seat above the vestibule section and through which said inlet passage extends, a valve head seatable upwardly on said seat to close the valve and said passage and unseatable downwardly into said vestibule to open the valve and passage, a valve operating stem extending upwardly from the valve head through said seat, and valve operating means operable through said stem and in timed relation with the engine piston to effect seating of the valve head during the power, exhaust and compression strokes of the piston, and to unseat the valve head to accommodate flow of air through such air inlet passage into the chamber during at least a portion of the piston intake stroke to replace at least a portion of the residue combustion products in said chamber by expulsion thereof through the aspirating passage means.

12. The subject set forth in claim 11 wherein said injection means is mounted in the upper endwall portion and wherein the fuel injection means comprises an injector also mounted in the upper endwall portion and constructed and arranged to inject a diverging spray of fuel downwardly into the chamber.

13. An auxiliary internal combustion chamber structure and controls therefor operable in combination with a cylinder of an internal combustion engine of the four-stroke-cycle type wherein the cylinder has in contiguity with an end thereof a variable volume space wherein a piston is reciprocal to sequentially perform a stroke of power attendant to expansion of said space by pressure of heated expanding products of combustion upon the piston, a stroke of exhaust to expel such products attendant to contraction of said space, a stroke of air intake attendant to the next expansion of said space, and a stroke of compression to compress the intaken air attendant to the next contraction of said space; said auxiliary chamber structure having a sidewall with an interior periphery generated circularly about a principal axis thereof, and endwall portions spaced apart axially of said periphery and complementing the same in the formation and enclosure of the combustion chamber of said structure, said structure including aspirating passage means communicating between the variable volume space and the interior of said chamber adjacently to one of the endwall portions, said passage means being operable pursuant to said compression stroke to conduct compressed air from the variable volume space into said chamber adjacently to the one endwall portion and said passage means including baffle means disposed for engagement by said conducted air to sequentially impart thereto a helical motion about the chamber axis and then deflect the helically moving air inwardly of the chamber radially of its axis so the air thus first entering the chamber through said aspirating passage means is compressed toward the other endwall portion by air thus subsequently entering said chamber, fuel injector means operable during the piston compression stroke to inject fuel into said first entering air to mix and form therewith a compressed combustible air-fuel mixture means contiguous to said other endwall portion, ignition means disposed in the chamber in position to be enveloped by said mass and energizable near the beginning of said power stroke to ignite the compressed air-fuel mass, the aspirating passage means being operable during combustion of the air-fuel mass ensuring such ignition to conduct a portion of the products of such combustion from said chamber into the variable volume space and thus effect the power stroke of the piston, a residual portion of said products of combustion subsequent to the ensuing exhaust stroke of the piston remaining within said chamber, said chamber structure having an air inlet passage leading into the chamber contiguously to said other endwall portion, inlet valve means operable to control flow through said inlet passage, and valve operating means operable in timed relation with the engine piston to preclude flow through the inlet passage during the power, exhaust and compression strokes of the piston and to accommodate flow of air through this inlet passage into the chamber during at least a portion of the piston intake stroke to replace at least some of the residual portion of combustion products by expulsion thereof through the aspirating passage means.

* * * * *